United States Patent
Yeom (10) Patent No.: US 8,391,147 B2
(45) Date of Patent: Mar. 5, 2013

(54) IP CONVERGED SYSTEM AND PACKET PROCESSING METHOD THEREIN

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 12/157,740

(22) Filed: Jun. 12, 2008

(65) Prior Publication Data

US 2008/0310307 A1 Dec. 18, 2008

(30) Foreign Application Priority Data

Jun. 12, 2007 (KR) .................. 10-2007-0057331

(51) Int. Cl.
*G01R 31/08* (2006.01)
*G06F 11/00* (2006.01)
(52) U.S. Cl. ........................................ 370/235
(58) Field of Classification Search .............. 370/235
See application file for complete search history.

(56) References Cited

U.S. PATENT DOCUMENTS

| | | | | |
|---|---|---|---|---|
| 6,680,906 | B1* | 1/2004 | Nguyen | 370/229 |
| 6,718,379 | B1* | 4/2004 | Krishna et al. | 709/223 |
| 7,146,478 | B2* | 12/2006 | Herkerdorf et al. | 711/167 |
| 2003/0093563 | A1* | 5/2003 | Young et al. | 709/245 |
| 2006/0078120 | A1* | 4/2006 | Mahendran et al. | 380/255 |
| 2008/0013534 | A1* | 1/2008 | Tsuzuki et al. | 370/389 |

* cited by examiner

*Primary Examiner* — Mark Rinehart
*Assistant Examiner* — Maharishi Khirodhar (57) ABSTRACT

An IP converged system includes a VoIP ALG module and a policer module. The VoIP ALG module acquires dynamically changing RTP IP/port information of a packet by parsing a VoIP SIP message, and transmits the RTP IP/port information to the policer module. The policer module sets IP/port, which provides a real-time data service, by referring to the information from the VoIP ALG module, and discriminatively sets a packet processing condition for a non-real-time data service and a packet processing condition for the real-time data service. The VoIP ALG module and the policer module share RTP IP/port information, dynamically determined by the negotiation between VoIP gateways or VoIP terminals, in call setup/release, so that the policer can discriminately drop or mark VoIP packets by referring to the RTP IP/port information.

20 Claims, 7 Drawing Sheets

CIR : Committed Information Rate
PIR : Peak Information Rate
PBS : Peak Burst Size
EBS : Excessive Burst Size
CBS : Committed Burst Size

IP CONVERGED SYSTEM AND PACKET PROCESSING METHOD THEREIN

CROSS-REFERENCE TO RELATED APPLICATION(S) AND CLAIM OF PRIORITY

The present application makes reference to and claims all benefits accruing under 35 U.S.C. §119 from an application for "IP CONVERGED SYSTEM AND PACKET PROCESSING METHOD THEREIN" earlier filed in the Korean Intellectual Property Office on Jun. 12, 2007 and there duly assigned Serial No. 2007-0057331.

TECHNICAL FIELD OF THE INVENTION

The present invention relates to an Internet protocol (IP) converged system and a packet processing method therein, in particular, capable of recognizing, at call setup/release, real-time transport protocol (RTP) IP/port, which would otherwise be dynamically determined by the negotiation between voice over Internet protocol (VoIP) gateways or VoIP terminals, and discriminatively applying a dropping or marking condition to a real-time data service packet, thereby ensuring the quality of service (QoS) of the real-time data service packet.

BACKGROUND OF THE INVENTION

Figure 1:
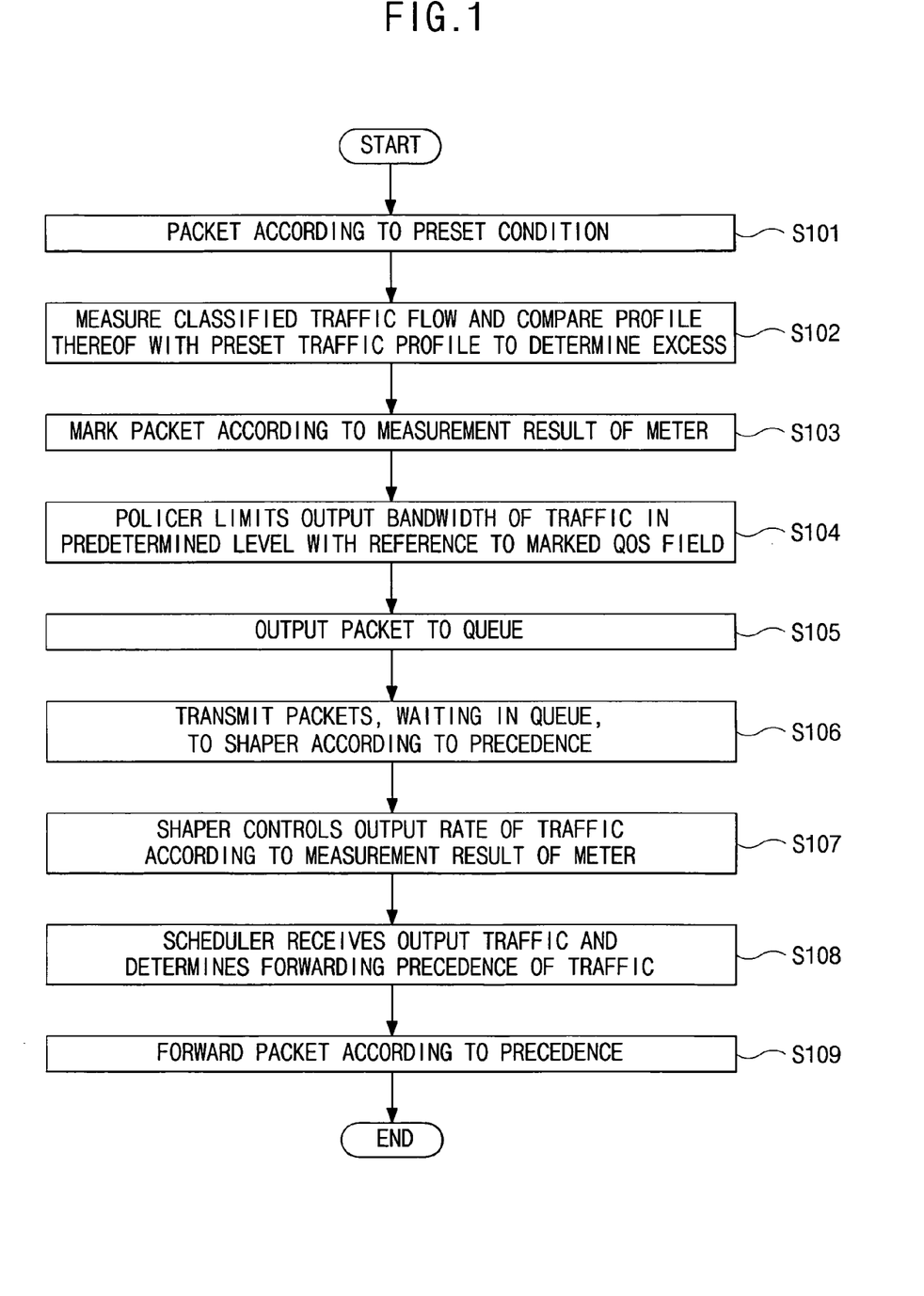
FIG. 1 is a flowchart illustrating a packet processing process for ensuring QoS in a conventional service.

Regarding characteristics of a real-time data service, it is required to provide the service without a delay or an interruption. For this, the real-time data service is required to ensure a preset bandwidth. In general, a packet processing process for ensuring QoS is as follows:

FIG. 1 is a flowchart illustrating a packet processing process for ensuring QoS in a conventional service.

Firstly, when traffic is received, a classifier classifies a packet according to preset conditions (S101). Here, the classifier transmits the classified packet to a meter.

The meter measures the traffic flow classified by the classifier. For example, the meter can measure the bandwidth or burst information using an input rate of the traffic flow. In the case of measuring the traffic flow, the meter determines an excess by comparing the profile of the input traffic with a preset traffic profile (S102). In general, the meter classifies the traffic into three categories: The first category satisfies the preset traffic profile. The second category exceeds the preset traffic profile in a preset range. The third category exceeds the preset traffic profile beyond the preset range. Based on the result, a marker carries out a suitable marking process.

The marker marks or remarks a QoS field of an IP packet, included in the traffic, according to the measurement result (S103). For marking, an IP precedence field and a type of service (ToS) field are necessary. The IP precedence field is used to ensure QoS, and is expressed using high three (3) bits of the ToS field present in an IP header. The larger the number is, the higher precedence may be. The marker marks the packet, and then sends the marked packet to a policer.

When the packet is received, the policer limits an output bandwidth in a predetermined level by referring to the marked QoS field (S104). In most cases, the policer adjusts the bandwidth of the traffic by dropping the packet. For this, the policer may include a dropper, which drops an IP packet of traffic when it is determined not to transmit the traffic.

Then, the policer outputs the packet to a queue in order to forward the packet according to the precedence of the packet (S105). Packets waiting in the queue are transmitted to a shaper according to the precedence (S106).

The shaper controls the output rate of the traffic according to the measurement result of the meter (S107). The shaper may be connected to a plurality of queues and a scheduler in order to receive traffic from the plurality of queues, and control the rate of the output traffic. The shaper transmits the packet to the scheduler according to a preset output rate.

The scheduler determines the forwarding precedence of the received output traffic (S108). The scheduler can ensure QoS by giving output precedence to respective traffic, classified as respective service flow, according to preset scheduling rules. Here, the scheduler can give the highest output precedence to traffic corresponding to a real-time data service such as VoIP.

In the case where a plurality of queues are included, each of the queues can be adapted to correspond to a traffic flow associated with each service in order to ensure efficient traffic scheduling. Here, traffic of a specific service flow is outputted through an assigned queue. The plurality of queues can have different levels of output precedence.

The scheduler forwards the packet according to the precedence (S109), thereby accomplishing the packet processing.

Figure 2A:
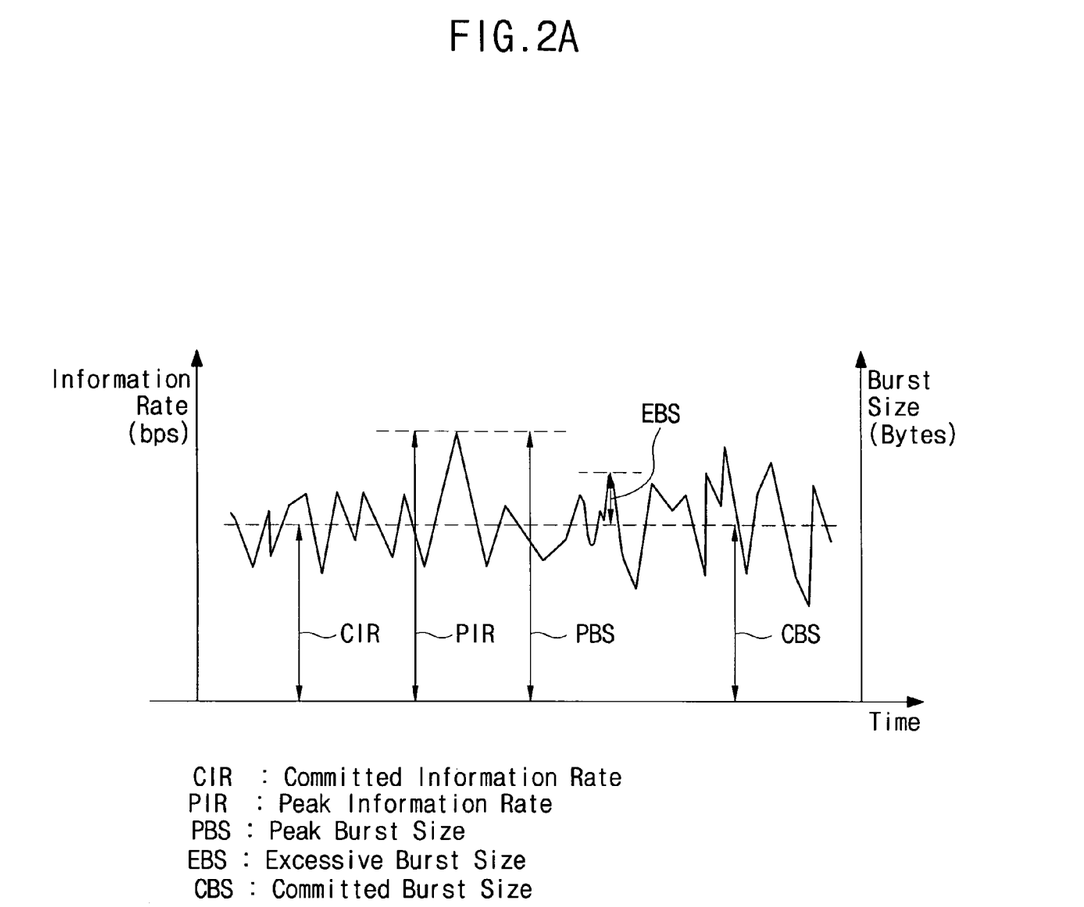
FIG. 2A is a diagram illustrating a status variation in the information rate of traffic and the resultant burst size of a packet.
Figure 2B:
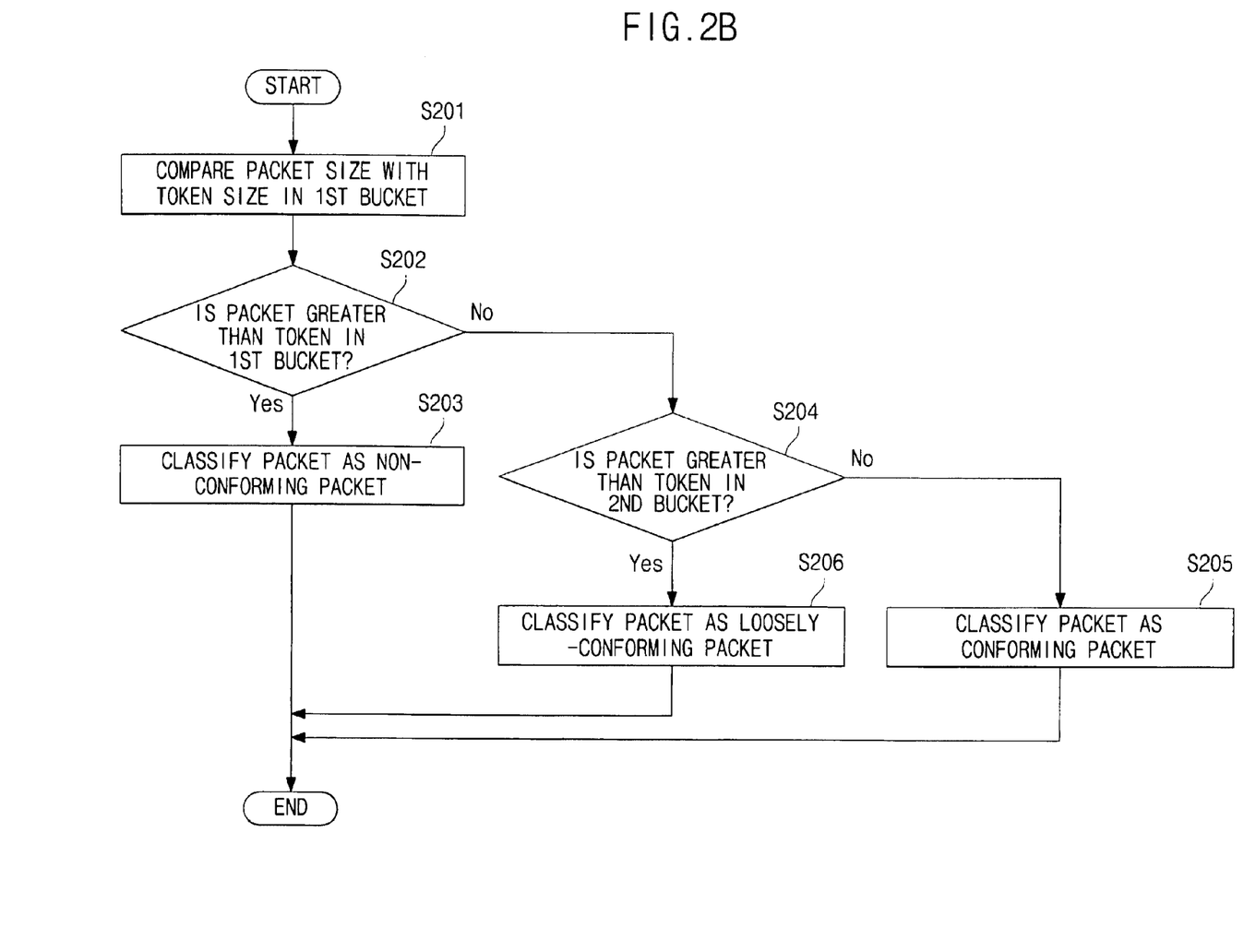
FIG. 2B is a flowchart illustrating a traffic metering process using a dual token bucket algorithm in the state as shown in FIG. 2A.

FIG. 2A is a diagram illustrating a status variation in the information rate of traffic and the resultant burst size of a packet, and FIG. 2B is a flowchart illustrating a traffic metering process using a dual token bucket algorithm in the state as shown in FIG. 2A.

In the diagram shown in FIG. 2A, the unit of the information rate is bit per second (bps), and the unit of the burst size is bytes. In addition, as shown in FIG. 2A, the information rate entering a network changes every moment.

Committed information rate (CIR) indicates an information rate that can be transmitted per logical channel when data is transmitted from a terminal to a network. The CIR also indicates a data transmission rate that the network ensures to the terminal in a normal state, and acts as a reference by which a user can control the processing rate when the network is congested. In addition, committed burst size (CBS) indicates the burst size of a packet when traffic is transmitted at the CIR.

On the other hand, peak information rate (PIR) indicates the maximum information rate that can be transmitted from the terminal to the network. In addition, peak burst size (PBS) indicates the burst size of a packet when traffic is transmitted at the PIR. The difference between the CBS and the PBS is referred to as excessive burst size (EBS).

Now, the traffic metering process using the dual token bucket algorithm in the state as shown in FIG. 2A will be described.

The dual token bucket algorithm uses PIR and CIR as a token rate, and a bucket itself is not used as an FIFO queue but is used to manage traffic-controlling tokens. In this case, the flow of traffic is controlled according to the existence of the tokens. Furthermore, the dual token bucket algorithm allows passage within a predetermined limit even if the traffic is burst.

The dual token bucket algorithm assigns two buckets. The size of the first bucket is PBS, and the token rate of the first bucket is PIR. The size of the second bucket is CBS, and the token rate of the second bucket is CIR.

When the traffic is received, the size of a packet is compared with that of a token in the first bucket (S201), and it is determined whether or not the packet size is greater than the token in the first bucket (S202). The size of the first bucket is set to be PBS, so that a greater packet cannot pass through. If the packet is greater than the token in the first bucket, the packet is classified as a non-conforming packet (S203).

If the packet is not greater than the token in the first bucket, the size of the packet is compared with that of a token in the second bucket (S204). Since the size of the second bucket is set to be CBS, a packet the same as or smaller than the token in the second bucket is allowed to pass through. In this case, the packet is classified as a conforming packet (S205). If the packet is greater than the token in the second bucket, it is classified as a loosely-conforming packet (S206). The loosely-conforming packet can be dropped in some cases. With this procedure, the traffic metering process using the dual token bucket algorithm is accomplished.

There are problems in providing a VoIP service in a network environment using private IP. Since private IP address in a protocol data unit (PDU) of a VoIP signal cannot be recognized from outside, the private IP address is required to be converted into a public IP address using network address translation (NAT). This requires an application level gateway (ALG), which can be included in a router or be installed in a separate proxy server.

In the absence of the ALG, it is required to use public IP. In practice, a VoIP service environment is frequently established using public IP without the application of the NAT.

Not only in the case of using private IP but also in the case of using public IP, specific IP and port information is required to be previously stored in a QoS policer. Traffic is marked with precedence in order to provide a QoS ensured service, and thus IP address and port number, through which the traffic is received, should be known in advance.

A real-time data service, which is currently supported on the network, uses dynamic IP address and port number. IP address and port number for exchanging packets are not previously assigned since the real-time data service does not use fixed IP address and port number. Rather, dynamic RTP IP/port is assigned by the capability negotiation between a packet transmitting part and a packet receiving part.

In this case, the QoS policer responds to a packet using dynamic IP/port as follows: In the case where a packet is transmitted using IP address and port number, which change in real-time, the QoS policer cannot recognize the dynamically changing IP address and port. Accordingly, the policer previously sets a range of IP address and port number, and then regards a packet as a real-time packet when received in this range of IP address and port number.

However, the above-described approach also has the following problems.

Firstly, in the case where the policer processes a real-time data service packet by setting previously assigned and fixed well-known IP/port, the substance of the real-time data service packet is not recognized, but only the priority field of the packet is referred to. Thus, this method is vulnerable to a real-time data service spam packet.

Secondly, there are a number of restrictions on setting dynamic RTP IP/port, which is determined by the capability negotiation between VoIP gateways or VoIP terminals. Owing to this problem, in the conventional VoIP service, a terminal generally transmits a VoIP packet by marking the priority field of the packet with precedence. However, it is still impossible to intercept a VoIP QoS spam packet having high precedence even if the spam packet is not a VoIP packet. Furthermore, when a VoIP gateway or a terminal did not mark precedence on the priority field, the packet cannot be processed.

Accordingly, the above-described problems degrade the QoS of the VoIP service.

SUMMARY OF THE INVENTION

To address the above-discussed deficiencies of the prior art, it is a primary object to provide traffic packet processing technology, by which, when an Internet telephony service is requested, an application level gateway (ALG) module in a router provides VoIP QoS through dynamic packet dropping or marking by sharing VoIP RTP IP/port information with a policer at the time of VoIP call setup or release. Furthermore, the invention, through interworking with a VoIP ALG module, also determines VoIP packet precedence, marked by a VoIP gateway or a VoIP terminal, drops a VoIP packet when the packet is determined as a VoIP QoS spam packet, and marks packet precedence on a VoIP packet when the packet is not marked in a priority field.

According to an aspect of the invention, there is provided an IP converged system includes a VoIP ALG module and a policer module. The VoIP ALG module acquires dynamically changing real-time transport protocol (RTP) IP/port information of a packet by parsing a VoIP session initiation protocol (SIP) message, and transmits the RTP IP/port information to the policer module. The policer module sets IP/port, which provides a real-time data service, by referring to the information from the VoIP ALG module, and discriminatively sets a packet processing condition for a non-real-time data service and a packet processing condition for the real-time data service.

The policer module may include a dropper module, when the dynamically changing RTP IP/port information is received, updating a packet processing policy table, which stores the packet processing condition for the non-real-time data service and the packet processing condition for the real-time data service, by reflecting the received information, and discriminately applying the packet processing condition for the non-real-time data service and the packet processing condition for the real-time data service; and a packet processing module dropping or transmitting the packet by referring to the packet processing policy table.

The packet processing policy table may store IP/port information for providing the real-time data service and information indicating how to mark precedence on the packet according to data service types.

The packet processing module, when precedence is not marked on a VoIP RTP packet, may mark precedence on the VoIP RTP packet by referring to the packet processing policy table and transmit the marked VoIP RTP packet.

Alternatively, the packet processing module may remove precedence from a common data packet before transmitting the data packet when the data packet marked with precedence is proved as a packet for providing a non-real-time data service to the packet processing policy table.

The VoIP ALG module may acquire the IP/port information by parsing the SIP message, which is for VoIP call setup and release.

According to another aspect of the invention, there is provided an IP converged network includes a VoIP terminal and an IP converged system. The VoIP terminal, in an attempt to connect a VoIP call, processes VoIP signaling with a counterpart device of the VoIP call, and transmits a VoIP session initiation protocol (SIP) message for VoIP call setup and release to an IP converged system. The IP converged system acquires dynamically changing real-time transport protocol (RTP) IP/port information of a packet by parsing the VoIP SIP message, sets IP/port, which provides a real-time data service, by referring to the acquired RTP IP/port information, and discriminatively sets a packet processing condition for a non-real-time data service and a packet processing condition for the real-time data service.

The VoIP terminal may include a VoIP signaling module and a VoIP media module. The VoIP signaling module carries out signaling for a VoIP call, and transmits a signaling-related VoIP SIP message for VoIP call setup and an SIP message for call release to the IP converged system. The VoIP media module, when voice and data are transmitted in response to a call between different networks, converts media according to compression information to be suitable to each network.

According to a further aspect of the invention, there is provided a packet processing method in an IP converged system. The method includes procedures of: acquiring dynamically changing RTP IP/port information of a packet by parsing an SIP message, setting IP/port, which provides a real-time data service, by referring to the acquired RTP IP/port information; and discriminatively setting a packet processing condition for a non-real-time data service and a packet processing condition for the real-time data service based upon the set IP/port information.

The procedure of setting IP/port may include acquiring the IP/port information by parsing the SIP message, which is for VoIP call setup and release.

The packet processing method may further include a procedure of: when the IP/port information is received, registering or deregistering RTP IP/port, which provides a real-time data service, to/from a packet processing policy table, thereby updating the packet processing policy table.

The packet processing method may further include a procedure of: when precedence is not marked on a VoIP RTP packet, marking the VoIP RTP packet with precedence by referring to the packet processing policy table and transmitting the marked VoIP RTP packet.

The packet processing method may further include a procedure of: when a common data packet marked with precedence is proved as a packet for providing a non-real-time data service to the packet processing policy table, removing precedence from the data packet before transmitting the data packet.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic communication system.

Exemplary embodiments of the invention will be described by way of example as providing a VoIP service. However, it is to be understood that the protective scope of the invention is not limited to the VoIP service but can cover all types of real-time data services that use dynamic IP address and port number.

Figure 3:
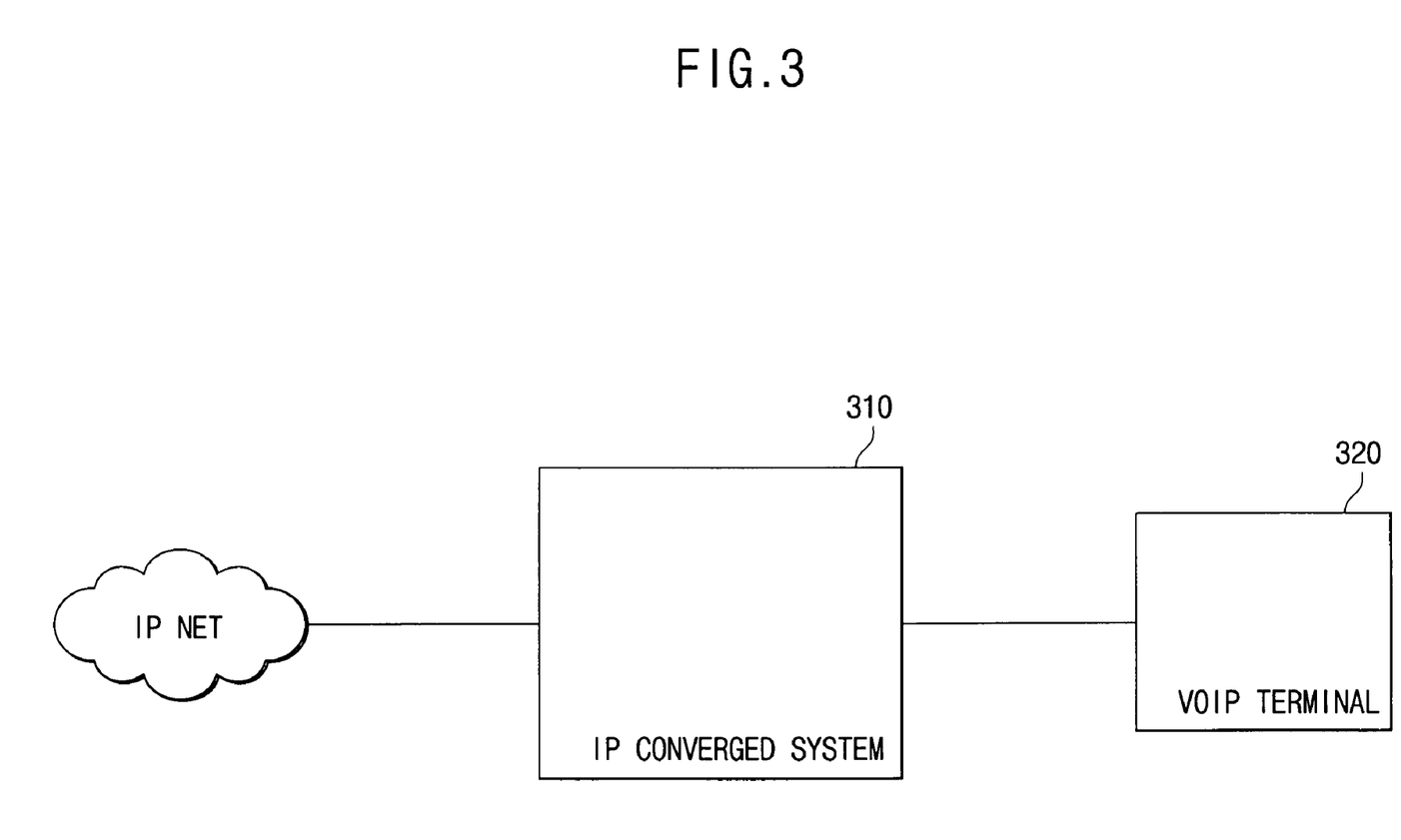
FIG. 3 is a block diagram illustrating a network architecture including an IP converged system according to the invention.

FIG. 3 is a block diagram illustrating a network architecture including an IP converged system 310 according to the invention.

The IP converged system 310 connects a VoIP terminal 320 to an IP network. The IP converged system 310 can simultaneously process channel switching and packet switching (Internet telephoning and Internet data transmission). In the case of providing a VoIP service using a private IP address, the IP converged system 310 can include a VoIP ALG module in order to solve IP traversal problems. The IP converged system 310 will be described in more detail later with reference to FIG. 4.

In an attempt to connect a VoIP call, the VoIP terminal 320 processes VoIP signaling with a counterpart device of the VoIP call, and sends a VoIP session initiation protocol (SIP) message for VoIP call setup and release to the IP converged system 310. The detailed construction of the VoIP terminal 320 will also be described in more detail with reference to FIG. 4.

Figure 4:
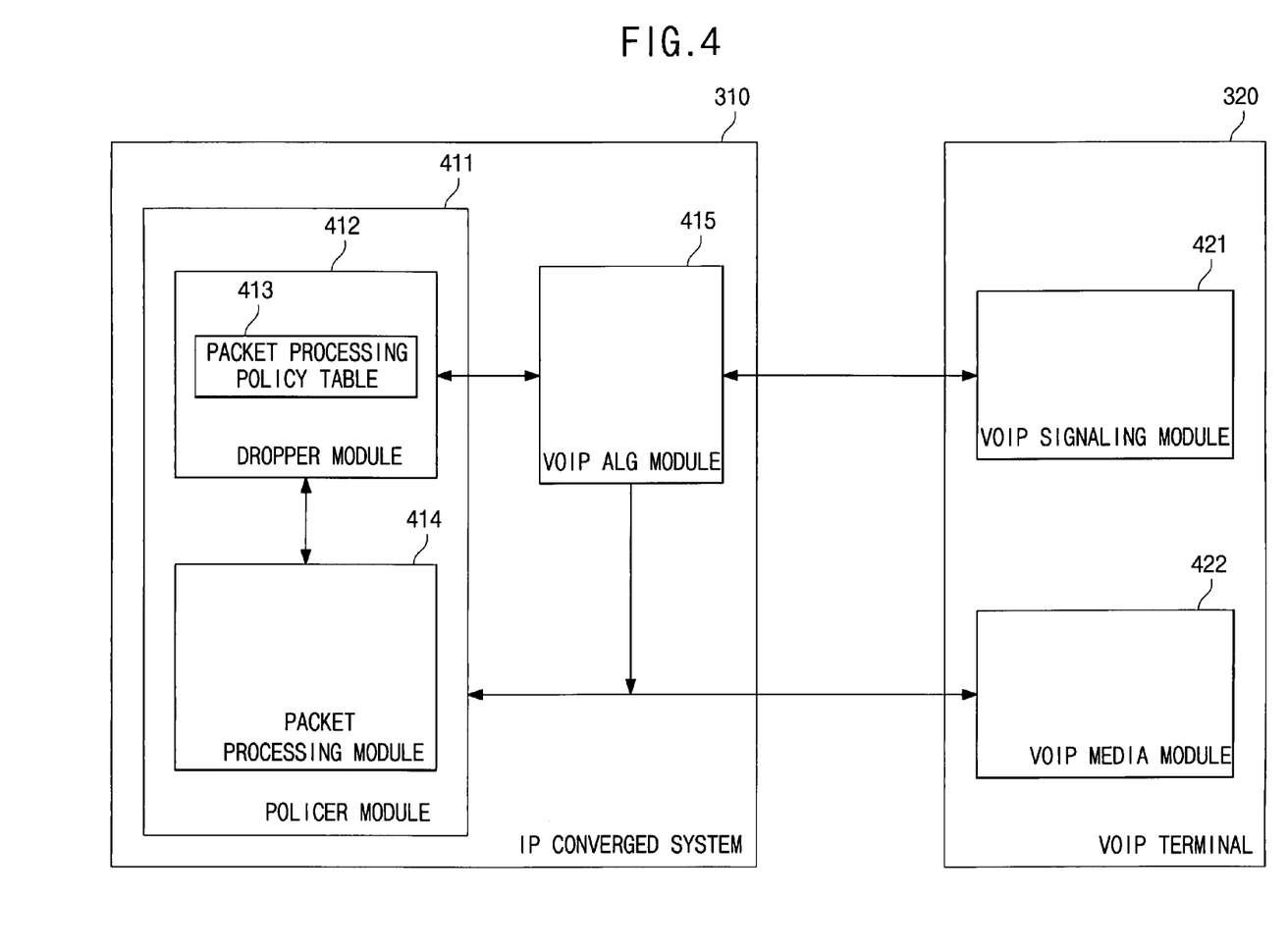
FIG. 4 is a block diagram illustrating an interworking relationship between the IP converged system and the VoIP terminal according to the invention.

FIG. 4 is a block diagram illustrating an interworking relationship between the IP converged system of the invention and the VoIP terminal.

The IP converged system 310 includes a policer module 411 and a VoIP ALG module 415.

The VoIP ALG module 415 processes IP traversal problems. For this, the VoIP ALG module 415 parses the VoIP SIP message, at the time of VoIP call setup and release, thereby changing IP information in the SIP message according to NAT environment.

In order to provide QoS according to dynamic packet drop/mark policy, the VoIP ALG module 415 recognizes dynamically changing RTP IP/port information by parsing the VoIP SIP message. Parsing the SIP message makes it possible to recognize the starting and terminating points (i.e., invite and bye points) of a service that uses the recognized RTP IP/port.

The VoIP ALG module 415 transmits, in real-time, the recognized VoIP RTP IP/port information to the policer module 411, thereby sharing the dynamic RTP IP/port information with the policer module 411.

The policer module 411 includes a dropper module 412 and a packet processing module 414.

The dropper module 412 drops a packet or allows the packet to pass through by referring to a packet processing policy table 413. The dropper module 412 can discriminatively apply drop conditions between a real-time data service and a non-real-time data service by referring to the dynamic RTP IP/port information, which the dropper module 412 shares with the VoIP ALG module 415.

Since the dynamically changing RTP IP/port information can be recognized, the dropper module 412 can set correct references for dropping packets and marking precedence according to the recognized information.

When the dynamically changing RTP IP/port information is received, in real-time, from the VoIP ALG module 415, the dropper module 412 updates the packet processing policy table 413 by referring to the information. That is, the dropper module 412 registers or deregisters the RTP IP/port, which transmits a packet for a VoIP service, to/from the packet processing policy table 413.

The packet processing policy table 413 stores the dynamic RTP IP/port information for transmitting a packet for the VoIP service. In this case, information stored in the packet processing policy table 413 is updated in real-time by the dropper module 412. The packet processing policy table 413 also may store policies of whether to drop or transmit a packet according to traffic type and of how to mark packet precedence according to traffic type (for example, a policy how to mark packet precedence if a packet is not marked with precedence, and a policy to remove precedence from a common data packet before transmitting the data packet when the data packet marked with precedence is proved as a packet for providing a non-real-time data service to the packet processing policy table).

The packet processing module 414 determines a packet processing method by referring to a proper policy stored in the packet processing policy table 413. Here, the packet can be dropped or transmitted according to the determined method. When the packet is determined as a VoIP RTP packet, the packet processing module 414 marks precedence on the packet according to the policy stored in the packet processing table 413 before transmitting the packet.

The VoIP terminal 320 generally includes a VoIP signaling module 421 and a VoIP media module 422.

The VoIP signaling module 421 carries out signaling for a VoIP call. The signaling for a VoIP call may include signaling for VoIP call setup and release and signaling for the exchange of other VoIP SIP messages. In the signaling for a VoIP call, the VoIP signaling module 421 transmits a signaling-related VoIP SIP message to the VoIP ALG module 415. For example, for VoIP call setup, the VoIP signaling module 421 transmits an SIP invite message to the VoIP ALG module 415. Then, the VoIP ALG module 415 can parse the VoIP SIP message, thereby acquiring the type of a corresponding packet and information on RTP IP/port for packet exchange from header information of the packet. In an attempt to terminate the VoIP service, the VoIP signaling module 421 transmits an SIP bye message to the VoIP ALG module 415 to initiate a call release request.

The VoIP media module 422 processes media transcoding for a VoIP call. That is, when voice and data are transmitted in response to a call between different networks, media conversion is carried out according to compression information to be suitable to each network.

Figure 5:
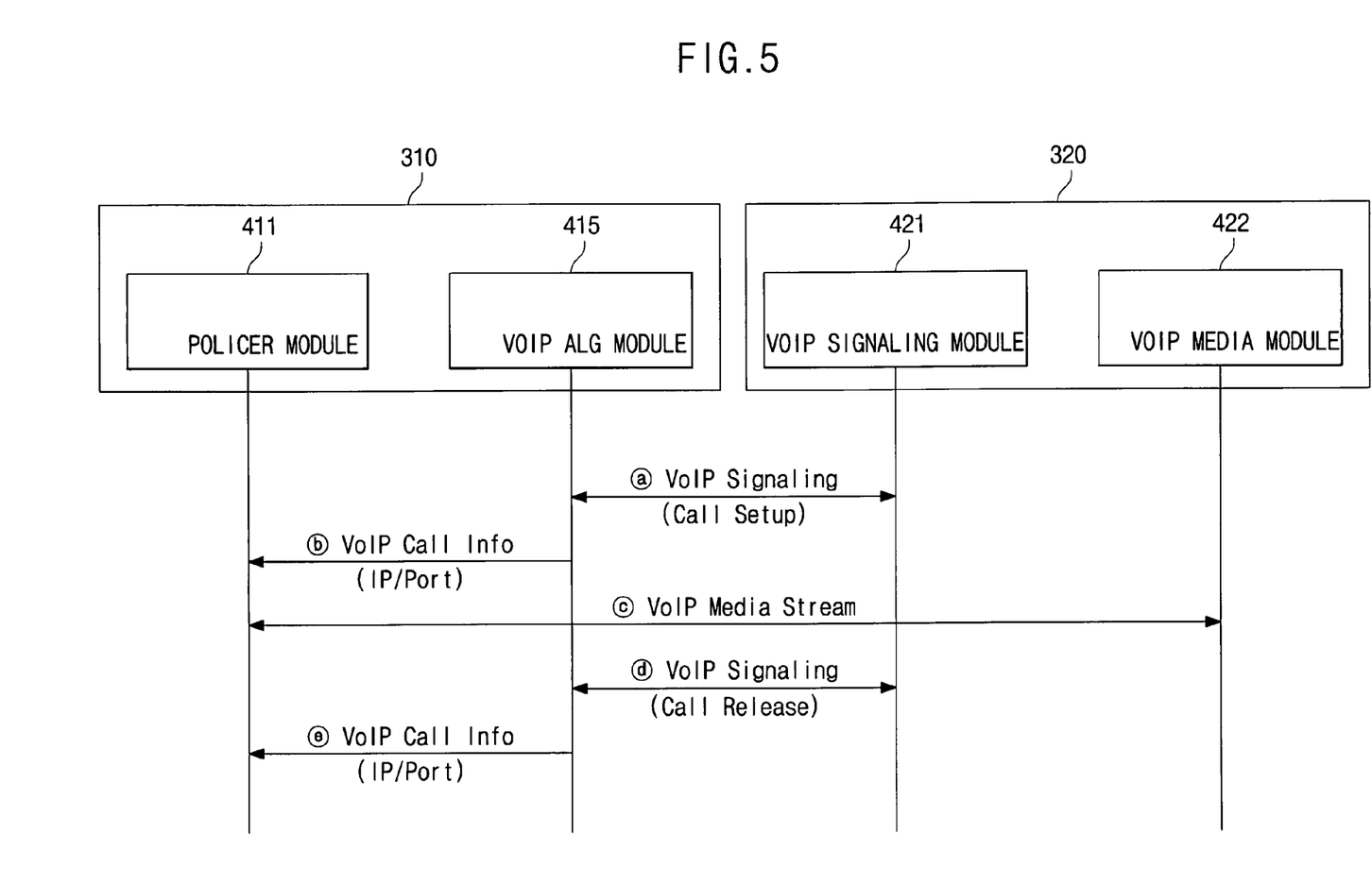
FIG. 5 is a flow diagram illustrating signal flows exchanged between the VoIP ALG module and the policer module according to the invention in order to share the dynamically changing RTP IP/port information.

FIG. 5 is a flow diagram illustrating signal flows exchanged between the VoIP ALG module 415 and the policer module 411 according to the invention in order to share the dynamically changing RTP IP/port information.

In an attempt to connect a VoIP call, the VoIP signaling module 421 can carry out VoIP signaling with a counterpart device of the VoIP call, and for this procedure, can use a VoIP signaling signal using a VoIP call setup message. Here, the VoIP signaling module 421 starts signaling using a well-known port number (e.g., an H.323 TCP 1719 or 1720 port or an SIP UDP 5060 port). The VoIP signaling module 421 also transmits a VoIP SIP message, related with the signaling, to the VoIP ALG module 415. This procedure is designated by the signal flow (a) in FIG. 5.

Referring to the second signal flow (b) in FIG. 5, the VoIP ALG module 415 transmits the RTP IP/port information, acquired through paring the VoIP SIP message, to the policer module 411. When the RTP IP/port information is received, the dropper module 412 of the policer module 411 discriminates one type of IP/port, which transmits VoIP packets, from another type of IP/port, which transmits other data, and based upon the discrimination, discriminately applies packet drop conditions.

The signal flow (c) in FIG. 5 shows a procedure of transmitting packets, to which the drop conditions are discriminately applied according to the procedure (b). The policer module 411 transmits the packets to the VoIP media module 422 by referring to respective IP/port specific policies from the packet processing policy table 413.

In the following procedure (d), when the VoIP call with the counterpart device is terminated, the VoIP signaling module 421 transmits a VoIP call release message to the VoIP ALG module 415.

Here, the VoIP ALG module 415 acquires the RTP IP/port information by parsing the message, and sends the acquired information to the policer module 411. This procedure is designated by the signal flow (e) of FIG. 5.

Figure 6:
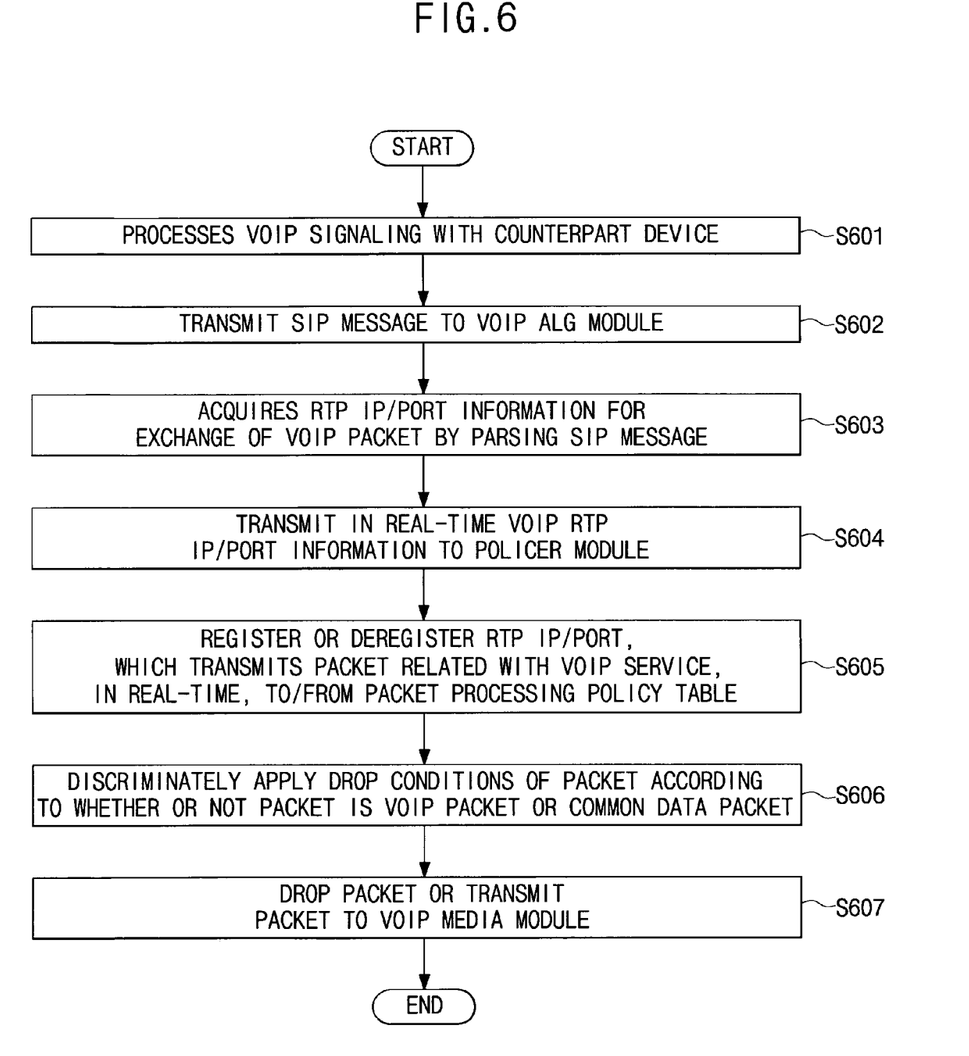
FIG. 6 is a flowchart illustrating a packet processing process in the IP converged system according to the invention.

FIG. 6 is a flowchart illustrating a packet processing process in the IP converged system according to the invention.

The VoIP signaling module 421 processes VoIP signaling with a counterpart device of a VoIP call in an attempt to connect the VoIP call (S601). Then, the VoIP signaling module 421 transmits an SIP invite message for VoIP call setup to the VoIP ALG module 415 (S602).

The VoIP ALG module 415 parses the VoIP SIP message, thereby acquiring RTP IP/port information for the exchange of VoIP packets (S603). Then, the VoIP ALG module 415 transmits, in real-time, the VoIP RTP IP/port information to the policer module 411 (S604).

Referring to the information received in real-time, the policer module 411 registers or deregisters, in real-time, RTP IP/port, which transmits VoIP service-related packets, to/from the packet processing policy table 413 (S605).

The policer module 411 judges whether or not a received packet corresponds to a VoIP packet. Here, the policer module 411 discriminately applies drop conditions of the packet by referring to the packet processing policy table 413 according to whether or not the packet is the VoIP packet or a common data packet (S606).

Then, the packet processing module 414 drops the packet or transmits the packet to the VoIP media module 422 by referring to the policies from the packet processing policy table 413 (S607). The VoIP media module 422 carries out media transcoding for the VoIP call, thereby accomplishing the packet processing by the intelligent policer according to the invention.

According to the IP converged system of the invention, the VoIP ALG module and the policer module share RTP IP/port information, dynamically determined by the negotiation between VoIP gateways or VoIP terminals, in call setup/release, so that the policer can discriminately drop or mark VoIP packets by referring to the RTP IP/port information. Furthermore, packet drop conditions can be discriminately applied to real-time data and non-real-time data, thereby ensuring the QoS of a VoIP service.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An Internet protocol (IP) converged system comprising:
an application level gateway (ALG) module configured to acquire dynamically changing real-time transport protocol (RTP) IP or port information of a packet by parsing a session initiation protocol (SIP) message, and to transmit the RTP IP or port information to a policer module; and
the policer module configured to set IP or port information, which provides a real-time data service, by referring to the information from the ALG module, and to set a packet processing condition for a non-real-time data service and a packet processing condition for the real-time data service, the policer module comprising:
a dropper module configured to update, when the RTP IP or port information is received, a packet processing policy table based on the received information, the packet processing policy table configured to store the packet processing condition for the non-real-time data service and the packet processing condition for the real-time data service, the dropper module further configured to apply the packet processing condition for the non-real-time data service and the packet processing condition for the real-time data service; and
a packet processing module configured to drop or transmit the packet by referring to the packet processing policy table.

2. The IP converged system according to claim 1, wherein the packet processing policy table is configured to store IP or port information for providing the real-time data service and information indicating how to mark precedence on the packet according to data service types.

3. The IP converged system according to claim 2, wherein the packet processing module, when precedence is not marked on a RTP packet, is configured to mark precedence on the RTP packet by referring to the packet processing policy table and to transmit the marked RTP packet.

4. The IP converged system according to claim 3, wherein the ALG module is configured to acquire the IP or port information by parsing the SIP message, which is for call setup and release.

5. The IP converged system according to claim 1, wherein the ALG module is configured to acquire the IP or port information by parsing the SIP message, which is for call setup and release.

6. The IP converged system according to claim 5, wherein the packet processing module is configured to remove precedence from a common data packet before transmitting the data packet when the data packet marked with precedence is determined to be a packet for providing a non-real-time data service to the packet processing policy table.

7. The IP converged system according to claim 1, wherein the packet processing module is configured to remove precedence from a common data packet before transmitting the data packet when the data packet marked with precedence is determined to be a packet for providing a non-real-time data service to the packet processing policy table.

8. An Internet protocol (IP) converged network comprising:
a terminal, in an attempt to connect a configured to process signaling with a counterpart device of the call and to transmit a session initiation protocol (SIP) message for call setup and release to an IP converged system; and
the IP converged system comprising:
an application level gateway (ALG) module configured to acquire dynamically changing real-time transport protocol (RTP) IP or port information of a packet by parsing the SIP message, and to transmit the RTP IP or port information to a policer module; and
the policer module configured to set IP or port information, which provides a real-time data service, by referring to the acquired RTP IP or port information, and to set a packet processing condition for a non-real-time data service and a packet processing condition for the real-time data service, the policer module comprising:
a dropper module configured to update, when the RTP IP or port information is received, a packet processing policy table based on the received information, the packet processing policy table configured to store the packet processing condition for the non-real-time data service and the packet processing condition for the real-time data service, the dropper module further configured to apply the packet processing condition for the non-real-time data service and the packet processing condition for the real-time data service; and
a packet processing module configured to drop or transmit the packet by referring to the packet processing policy table.

9. The IP converged network according to claim 8, wherein the packet processing policy table is configured to store IP or port information for providing the real-time data service and information indicating how to mark precedence on the packet according to data service types.

10. The IP converged network according to claim 9, wherein the packet processing module, when precedence is not marked on a RTP packet, is configured to mark precedence on the RTP packet by referring to the packet processing policy table and transmits the marked RTP packet.

11. The IP converged network according to claim 10, wherein the ALG module is configured to acquire the IP or port information by parsing the SIP message, which is for call setup and release.

12. The IP converged network according to claim 8, wherein the ALG module is configured to acquire the IP or port information by parsing the SIP message, which is for call setup and release.

13. The IP converged network according to claim 12, wherein the packet processing module is configured to remove precedence from a common data packet before transmitting the data packet when the data packet marked with precedence is determined to be a packet for providing a non-real-time data service to the packet processing policy table.

14. The IP converged network according to claim 8, wherein the packet processing module is configured to remove precedence from a common data packet before transmitting the data packet when the data packet marked with precedence is determined to be a packet for providing a non-real-time data service to the packet processing policy table.

15. A packet processing method in an Internet protocol (IP) converged system, the method comprising:
acquiring, at an application level gateway (ALG) module, dynamically changing real-time transport protocol (RTP) IP or port information of a packet by parsing a session initiation protocol (SIP) message;

setting, at a policer module, IP or port information, which provides a real-time data service, by referring to the acquired RTP IP or port information;

setting, at the policer module, a packet processing condition for a non-real-time data service and a packet processing condition for the real-time data service based upon the set IP or port information;

updating, at a dropper module, a packet processing policy table based on the RTP IP or port information, the packet processing policy table configured to store the packet processing condition for the non-real-time data service and the packet processing condition for the real-time data service;

applying, at the dropper module, the packet processing condition for the non-real-time data service and the packet processing condition for the real-time data service; and dropping or transmitting, at a packet processing module, the packet by referring to the packet processing policy table.

16. The packet processing method according to claim 15, wherein the setting of the IP or port information comprises acquiring the IP or port information by parsing the SIP message, which is for call setup and release.

17. The packet processing method according to claim 8, further comprising:

when the IP or port information is received, registering or deregistering RTP IP or port, which provides a real-time data service, to or from a packet processing policy table, thereby updating the packet processing policy table.

18. The packet processing method according to claim 17, further comprising:

when precedence is not marked on a RTP packet, marking the RTP packet with precedence by referring to the packet processing policy table and transmitting the marked RTP packet.

19. The packet processing method according to claim 18, wherein the setting of the IP or port information comprises acquiring the IP or port information by parsing the SIP message, which is for call setup and release.

20. The packet processing method according to claim 17, further comprising:

when a common data packet marked with precedence is determined to be a packet for providing a non-real-time data service to the packet processing policy table, removing precedence from the data packet before transmitting the data packet.

* * * * *